Nov. 25, 1930.                S. G. GREEN                1,782,610
                             GUN CARRIAGE
                          Filed Aug. 9, 1929
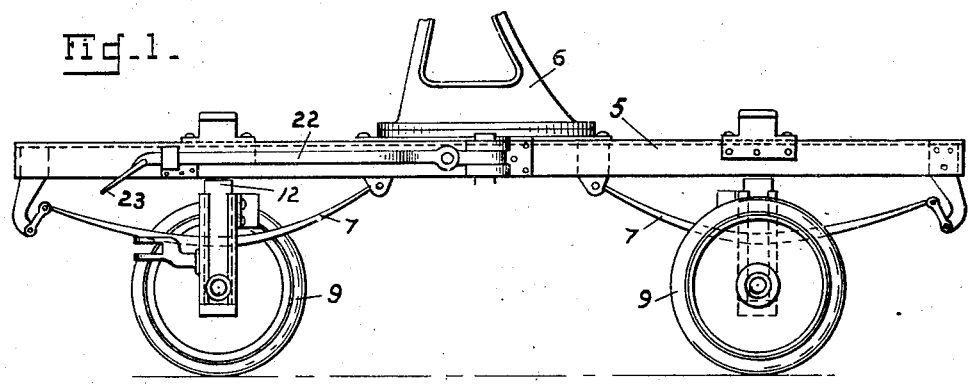
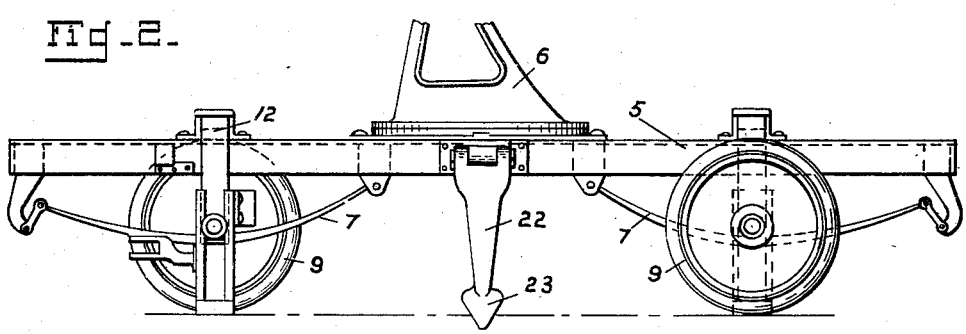
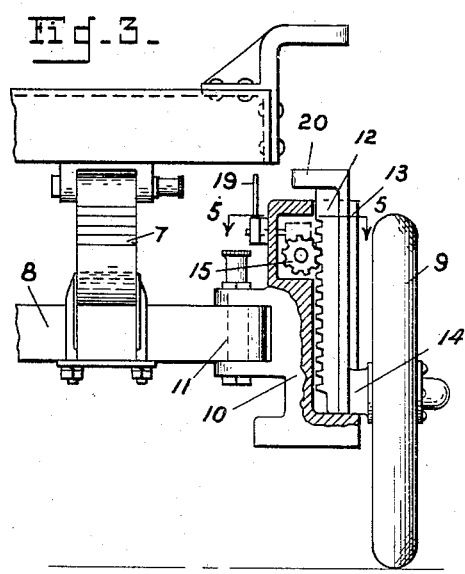
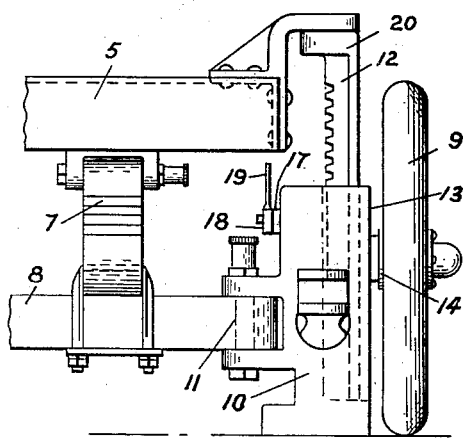
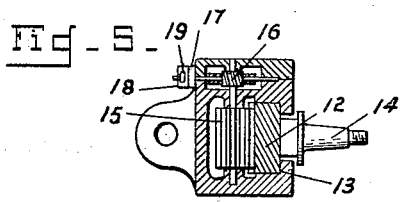
Inventor
Samuel G. Green
By W. N. Roach
Attorney Patented Nov. 25, 1930

1,782,610

UNITED STATES PATENT OFFICE

SAMUEL G. GREEN, OF JONES, GEORGIA

GUN CARRIAGE

Application filed August 9, 1929. Serial No. 384,745.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

The subject of this invention is a gun carriage.

Mobile gun carriages which are designed to constitute semi-fixed platform mounts are generally emplaced by removing the wheel units and lowering the platform to the ground or by elevating the platform with respect to the axle in order to remove the load from the springs. According to the first method the jacks are carried by the platform while in the second method the jacks may be carried either by the platform or the axles.

In the gun carriage of this invention it is proposed to carry the jacks in the wheels and to first lower the axles and platform and then by a continuation of the lowering movement to elevate the platform sufficiently to remove the load from the springs.

With the foregoing and other objects in view, the invention resides in the novel arrangement and combination of parts and in the details of construction hereinafter described and claimed, it being understood that changes in the precise embodiment of the invention herein disclosed may be made without departing from the spirit of the invention.

A practical embodiment of the invention is illustrated in the accompanying drawings, wherein:

Fig. 1 is a view in side elevation with one wheel removed, showing a gun carriage embodying my improvement in position for traveling;

Fig. 2 is a view in side elevation of the gun carriage in position for firing;

Fig. 3 is a fragmentary view partly in end elevation and partly in section of Fig. 1;

Fig. 4 is a similar fragmentary view of Fig. 2; and

Fig. 5 is a detail sectional view on the line 5—5 of Fig. 3.

Referring to the drawings by numerals of reference:

There is shown a gun carriage of the four-wheel trailer type whose platform 5 carries a pedestal mount 6 on which is trunnioned the gun (not shown). The platform is suspended on springs 7 which are fastened to the axles 8.

The axles are connected to the wheels 9 by means of jacks, the frame or pedestal 10 of a jack being mounted on the extremity of the axle and in the case of the front steering wheels this frame is held by a vertical pivot pin 11. The rack bar 12 of a jack is positioned within the guides 13 of the frame and at its lower end it carries a stud axle 14 for the wheel. The actuating mechanism of the jack is conventional and consists of the pinion 15, worm gearing 16, ratchet and pawl indicated at 17 and socket member 18 for the lever 19.

The head 20 of the rack bar is enlarged and because of the position of the jack it is arranged to engage the platform.

The emplacing of the carriage is accomplished by actuating the jacks at each corner of the carriage to lower the axles and this movement is continued until the foot of each jack rests on the ground. If the ground is normally level, the heads 20 of the jacks will be in proximity to the platform and a further actuation of the jacks will cause the heads to engage the platform and then raise it sufficiently to remove the load from the springs.

In order to provide uniform stability for all around firing, an outrigger 22 hinged centrally to the platform on the sides of the carriage is swung out and secured by a spade 23.

In changing from the firing to the traveling position, the foregoing operation is reversed.

I claim:

1. A gun carriage including front and rear axles, a jack pedestal on each extremity of the axle, the pedestals provided with a foot, and the pedestals on at least one axle being pivoted for steering, a rack bar in each pedestal, means for actuating the rack bar, a stub axle on the lower portion of the rack bar, a wheel on the stub axle, and a platform suspended on the axles, having portions overlying the rack bar in position to be engaged by the rack bar when the foot of the pedestal contacts the ground to support the platform independently of the wheels.

2. A gun carriage embodying a platform, axles upon which the platform is mounted, a jack pedestal on each extremity of the axle, the pedestal provided with a ground engaging foot, a rack bar in each pedestal, a stub axle on each rack bar, a wheel mounted on each stub axle, means on the platform adapted to be engaged by the rack bar when the foot of the pedestal engages the ground to support the platform independently of the wheels, and means for actuating the rack bar.

SAMUEL G. GREEN.